M. JACOBS.
Potato Digger.
No. 84,828.
Patented Dec. 8, 1868.
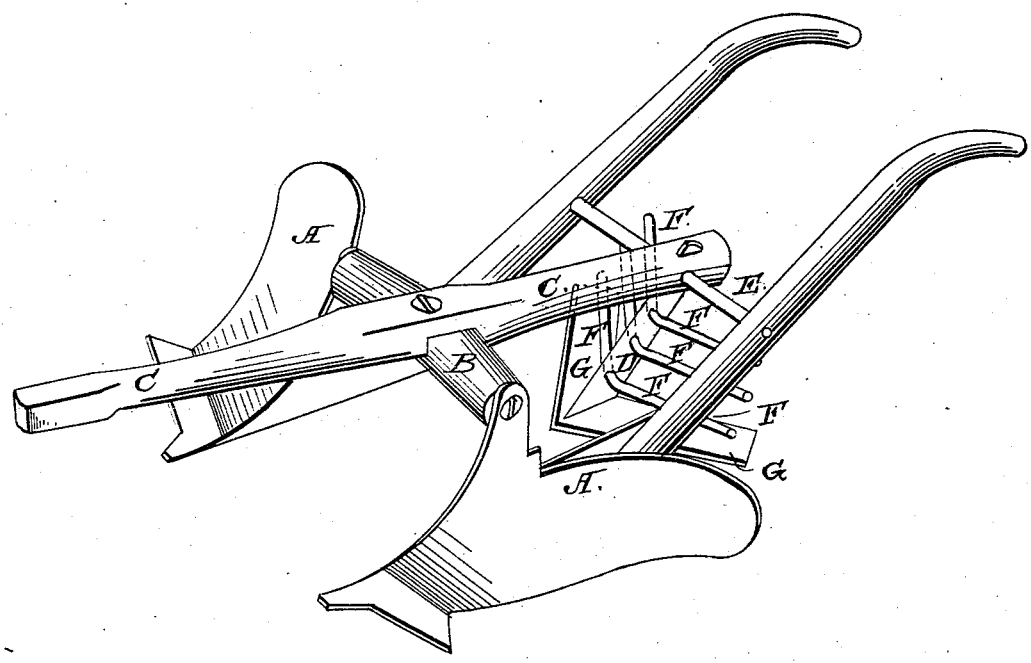
Witnesses
Inventor:
Marion Jacobs.
per. A. B. Stoughton
attorney

MARION JACOBS, OF STURGIS, MICHIGAN.

Letters Patent No. 84,828, dated December 8, 1868.

IMPROVEMENT IN POTATO-DIGGER.

The Schedule referred to in these Letters Patent and making part of the same.

*To all whom it may concern:*

Be it known that I, MARION JACOBS, of Sturgis, in the county of St. Joseph, in the State of Michigan, have invented a new and useful Apparatus for Digging Potatoes; and I do hereby declare that the following is a full and exact description thereof, reference being had to the accompanying drawings, and to the letters of reference marked thereon.

My invention consists in the arrangement of two plows, of any ordinary construction, placed parallelly, and as far apart as requisite, together with a third one, of peculiar construction, which will be hereafter described, and which, by way of distinction, I designate as the digger, and which is situated just in rear of and with its point midway between the parallel plows.

My invention further consists in constructing the digger or rear plow with the coulter, angular blades, or shares, and rods, the latter projecting radially from the centre of the sides of the coulter, so that, with a view to economy as well as strength, it may be cast in one piece, the rods being of sufficient diameter, so as to dispense with the necessity of any upright or other supports or braces which might impede the free passage of the soil or potato-tops from between them.

To enable others skilled in the art to make my invention, I will proceed to describe its construction, reference being had to the accompanying drawings, in which—

Figure 1 is a perspective view of the potato-digger.

The parallel plows A are united by a cross-piece, B.

To the beam C the coulter D, of the digger, is attached, a transverse rod, E, also passing through both beam and coulter, and connecting the coulter and beam to the handles of the parallel plows.

To the centre of the sides of the coulter are secured radially-projecting rods F, these being formed of such diameter, and being strongly fastened at their base, so as to do away with the necessity of having supports or braces which would impede the free passage of the soil or potato-tops, or other vegetation, as the apparatus is moved along.

The shares G, which might be called angular blades, are bevelled, and, with the coulter and rods, are so constructed as to be cast in one piece.

The plows are placed in advance of the digger, and at such distance apart from each other as to be made to form trenches or furrows for the reception of the potatoes, which, by the passage of the digger, are thrown into them. They can thus be conveniently and readily gathered, without the delay and inconvenience of picking them from a mass of loose earth and vegetation.

Having thus described my invention,

What I claim as new, and desire to secure by Letters Patent, is—

The arrangement of the plows A, with the devices D, F, and G, forming the digger, all as shown, and for the purposes described.

MARION JACOBS.

Witnesses:
 JOSEPH McTODD,
 CALVIN MARBLE.